United States Patent
Rascon et al.

(10) Patent No.: US 12,372,049 B2
(45) Date of Patent: Jul. 29, 2025

(54) VACUUM INSULATED BLAST TUBE

(71) Applicant: Raytheon Company, Waltham, MA (US)

(72) Inventors: John Rascon, Tucson, AZ (US); Anthony V. Formica, Oro Valley, AZ (US); John Regis Leach, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 35 days.

(21) Appl. No.: 18/471,908

(22) Filed: Sep. 21, 2023

(65) Prior Publication Data

US 2025/0101933 A1 Mar. 27, 2025

(51) Int. Cl.
*F02K 9/34* (2006.01)
*F02K 9/40* (2006.01)

(52) U.S. Cl.
CPC ............... *F02K 9/34* (2013.01); *F02K 9/346* (2013.01); *F02K 9/40* (2013.01)

(58) Field of Classification Search
CPC ... B64G 1/52; F02K 9/34; F02K 9/346; F02K 9/40; F02K 9/97; F02K 9/972; F02K 9/974
See application file for complete search history.

(56) References Cited

U.S. PATENT DOCUMENTS

| | | | |
|---|---|---|---|
| 2,825,107 A | 3/1958 | Edward | |
| 2,835,107 A | 5/1958 | Ward | |
| 3,354,651 A | * 11/1967 | Novotny | F02K 9/974 239/265.15 |
| 3,354,652 A | 11/1967 | Novotny et al. | |
| 3,493,177 A | 2/1970 | Bromberg et al. | |
| 4,468,012 A | 8/1984 | Daussan et al. | |
| 4,504,532 A | 3/1985 | Herring | |
| 8,707,947 B2 | 4/2014 | Hollis et al. | |
| 10,760,531 B2 | 9/2020 | Brennan et al. | |
| 12,065,990 B1 | 8/2024 | Rascon et al. | |
| 2007/0264435 A1 | 11/2007 | Venett et al. | |

(Continued)

OTHER PUBLICATIONS

Javed, Afroz, et al., "Numerical Exploration of Solid Rocket Motor Blast Tube Flow Field", Defence Science Journal, vol. 63, No. 6, (Nov. 2013), 616-621.

(Continued)

*Primary Examiner* — Scott J Walthour
(74) *Attorney, Agent, or Firm* — Schwegman Lundberg & Woessner, P.A.

(57) ABSTRACT

A vacuum insulated blast tube includes an insulating layer of a burn resistant material such as phenolic resin formed on an interior surface of the blast tube to provide the necessary erosion and thermal insulation properties to protect the blast tube and a vacuum insulated layer formed in the walls of the blast tube itself to provide the additional thermal insulation properties to protect any non-propulsive sub-systems positioned in the void space around the blast tube. A void space in the walls of the blast tube is held under vacuum with a pressure of less than 25 Torr and a thermal conductivity Tcond_vac of less than one-third of the thermal conductivity of air Tcond_air to form the vacuum insulation layer.

17 Claims, 3 Drawing Sheets

(56) References Cited

U.S. PATENT DOCUMENTS

2016/0208406 A1    7/2016  Jung et al.

OTHER PUBLICATIONS

Tahsini, A. M., et al., "Blast Tube Effects on Internal Ballistics of SRM", 42nd AIAA/ASME/SAE/ASEE Joint Propulsion Conference & Exhibit, Jul. 9-12, 2006, Sacramento, California, 4 pgs.
"U.S. Appl. No. 18/471,881, Non Final Office Action mailed Feb. 14, 2024", 20 pgs.
"Sulfur hexafluoride", Wikipedia, (Feb. 9, 2020).
"U.S. Appl. No. 18/471,881, Response filed Mar. 26, 2024 to Non Final Office Action mailed Feb. 14, 2024", 8 pgs.
"U.S. Appl. No. 18/471,881, Notice of Allowance mailed Apr. 16, 2024", 10 pgs.
C, Mougel, "Phenolic Foams: A review of mechanical properties, fire resistance and new trends in phenol 5 substitution", Polymer, vol. 164, (2019), 86-117.
"International Application Serial No. PCT US2024 047329, International Search Report mailed Dec. 16, 2024", 4 pgs.
"International Application Serial No. PCT US2024 047329, Written Opinion mailed Dec. 16, 2024", 7 pgs.
"International Application Serial No. PCT US2024 047327, International Search Report mailed Dec. 17, 2024", 3 pgs.
"International Application Serial No. PCT US2024 047327, Written Opinion mailed Dec. 17, 2024", 6 pgs.
U.S. Appl. No. 18/471,881, filed Sep. 21, 2023, Heavy Inert Gas Insulated Blast Tube.

\* cited by examiner

VACUUM INSULATED BLAST TUBE

BACKGROUND

Field

This disclosure relates to insulated blast tubes for rocket motors.

Description of the Related Art

A blast tube is positioned between the nozzle and propellant section of tactical rocket motors when the nozzle is not connected directly to the rocket motor in the missile design. The blast tube, normally a cylindrical conduit, conveys hot combustion products of the propellant in the rocket motor to the nozzle. A blast tube insulator is carried by the blast tube around its inner surface for protecting the blast tube from these hot combustion products during flight of the missile.

A blast tube insulator must have thermal properties, including char rates, which are consistent with its high temperature, erosive environment. A type of blast tube insulator comprises phenolic resin and chopped silica or carbon cloth. These blast tube insulators are expensive and difficult to process; moreover, they are so highly filled with the silica or carbon cloth as to have high densities leading to higher inert weights carried by the tactical rockets in which they are employed.

U.S. Pat. No. 4,504,532 entitled "Phenolic Blast Tube Insulators for Rocket Motors" overcomes these deficiencies through incorporation of relatively inexpensive particulates into cured phenolic resins in a manner that reduces the density of the insulator while maintaining acceptable char rates therefor. More particularly, silica particulate and carbon or polyaramide fibers replace the chopped carbon or silica cloths to produce lower cost and lower density insulators without significant loss in properties, including char rates and without the attendant difficulties of handling such cloths.

As shown in FIG. 1, a rocket 100 includes a rocket motor 104 positioned in a cylindrical rocket motor casing 106 having a diameter D1. Rocket motor 104 includes a combustion chamber 108 containing a propellant 110. A blast tube 112 having a diameter D2<D1 is positioned downstream of the combustion chamber 108 and serves as an extended inlet 114 to a nozzle 116. Typically, inlet 114, blast tube 112 and nozzle 116 are integrally formed as a single piece. Throat inserts 117 are positioned at the entrance to nozzle 116. Ignition of propellant 110 produces hot gasses 118 that travel through the blast tube 112 where they are expelled by nozzle 116 to produce thrust. As used herein, the terms "rocket" and "rocket motor" should be understood to broadly cover self-propelled systems such as rockets, missiles or the like.

To protect blast tube 112 from the erosion and higher temperature effects of the hot gasses 118, an insulating layer 120 of phenolic resin is formed on an interior surface of blast tube 112. An initial thickness t1 of phenolic resin is required to counter the erosion effects of the gases. An additional thickness t2 of phenolic resin is further required to counter the high temperature effects of the gases. The insulating layer 120 cannot be consumed before the rocket flight has terminated. Without this additional thickness, the temperatures would be sufficiently elevated to degrade the blast tube in flight.

The blast tube 112 defines an annular void space 122 between the outer surface of the blast tube and the cylindrical rocket motor casing 106. Non-propulsive sub-systems 124 such as a control actuation system (CAS) or thrust vector controls (TVC) may be positioned in the annular void space 122.

These non-propulsive sub-systems 124 must be thermally insulated from the elevated temperatures inside the blast tube. Accordingly, an additional thickness t3 of phenolic resin is required for additional thermal insulation. The exact and relative values of t1, t2 and t3 will depend on the specific rocket and rocket motor configuration.

The rocket motor configuration will determine an inner or throat diameter Dthroat at the entrance to nozzle 116. The throat diameter Dthroat plus the total thickness t1+t2+t3 of the phenolic resin and the thickness of blast tube 112 will determine the outer diameter D2. The greater the required thickness of phenolic resin to provide the necessary erosion and thermal insulation capabilities the larger the diameter D2, which means less volume in annular void space 122 to accommodate non-propulsive sub-systems 124.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides an insulated blast tube in which an insulating layer of a burn resistant material such as phenolic resin is formed on an interior surface of the blast tube to provide the necessary erosion and thermal insulation properties to protect the blast tube and a vacuum insulated layer is formed in the walls of the blast tube itself to provide the additional thermal insulation properties to protect any non-propulsive sub-systems positioned in the void space around the blast tube. The vacuum insulated layer being a far better thermal insulator than any burn resistant material or air.

For equivalent rocket motor designs and thermal insulation requirements, the vacuum insulated blast tube is lighter weight and has a smaller diameter D2. Less weight is generally desirable and specifically in a blast tube to ensure that the center of gravity (Cg) of the rocket in flight is properly positioned relative to the center of pressure (Cp). A smaller diameter D2 produces a larger volume of void space to accommodate non-propulsive sub-systems. For like designs, the vacuum insulated blast tube will be at least 10% lighter and have a diameter D2 that is at least 20% smaller.

In an embodiment, a vacuum insulated blast tube includes a hollow blast tube shell defining a void space therein along a length of the shell. An insulating layer formed of a burn resistant material (e.g., phenolic resin) is formed on an interior surface of the shell. The void space is held under vacuum with a pressure of less than 25 Torr (assuming operation of the rocket at or near sea level and room temperature of 25 C) and exhibits a thermal conductivity Tcond_vac of less than one-third of the thermal conductivity of air Tcond_air to form a vacuum insulation layer.

In different embodiments, the vacuum may be a medium vacuum between 25 Torr and $10^{-3}$ Torr or a high vacuum between $10^{-3}$ Torr and $10^{-6}$ Torr. A higher vacuum (lower pressure) corresponds to less particles (contaminants) in the vacuum and thus a lower thermal conductivity. Tcond_vac may be less than one-fifth Tcond_air and reach a limit of approximately 6.6× less than air. Tcond_vac is about one two-hundred and fiftieth (½₅₀) that of phenolic resin and thus a much better thermal insulator.

In an embodiment, the burn resistant material is just thick enough to withstand erosion and elevated temperatures of hot gasses passing therethrough due to the combustion of propellant to protect the blast tube. The vacuum insulation layer provides additional thermal insulation to achieve a total thermal insulation to protect the non-propulsion sub-systems. For example, in all blast tube designs the burn resistant material will provide at most 40% of the total thermal insulation and the vacuum insulation layer provides at least 60% of the total thermal insulation. In many blast tube designs the burn resistant material will provide at most 25% and the vacuum insulation layer at least 75% of the total thermal insulation.

These and other features and advantages of the disclosure will be apparent to those skilled in the art from the following detailed description of preferred embodiments, taken together with the accompanying drawings, in which:

DETAILED DESCRIPTION

Figure 1:
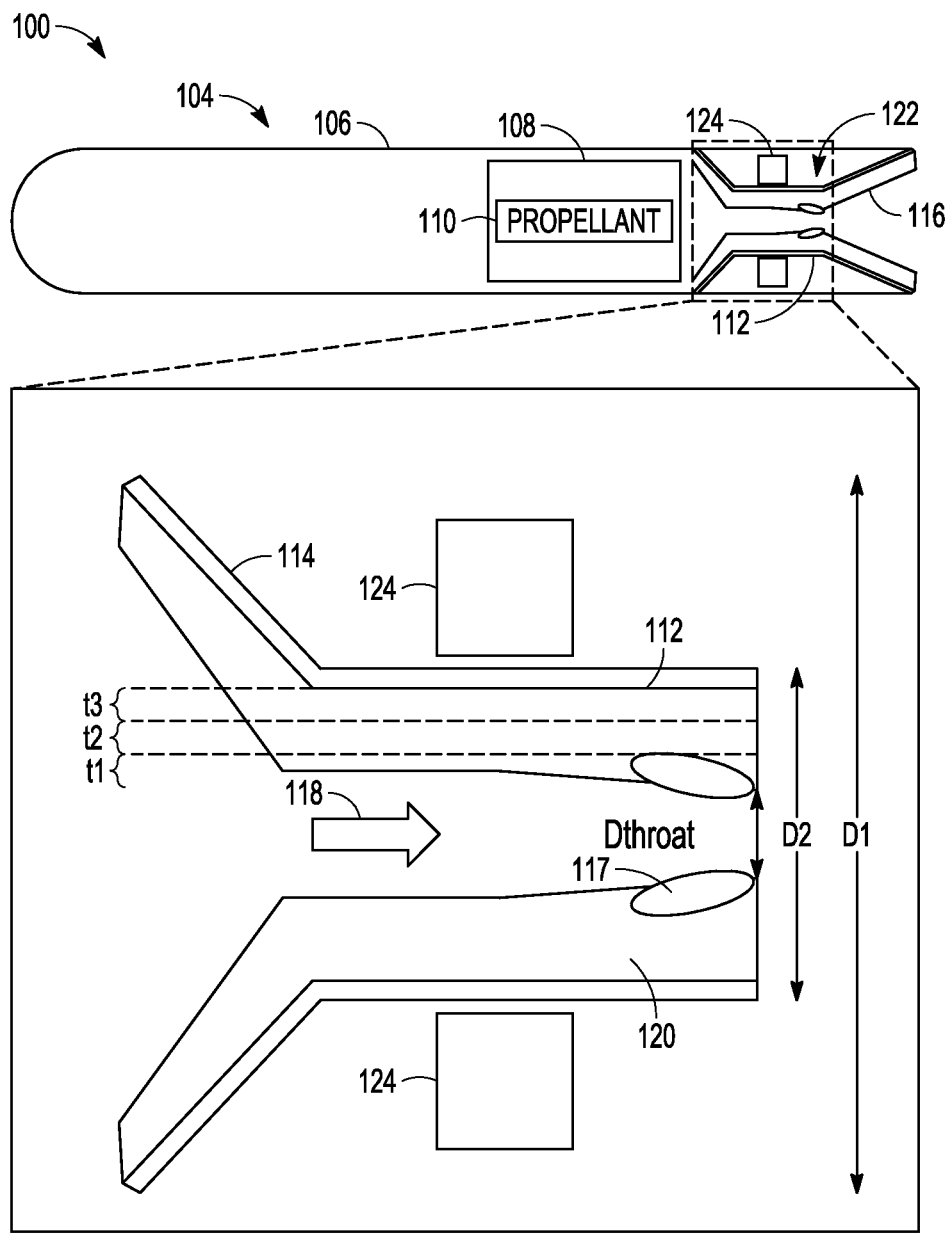
FIG. 1, as described above, is an embodiment of a known insulated blast tube design in which a layer of phenolic resin is formed on an inner surface of the blast tube of sufficient thickness to protect both the blast tube and any non-propulsive sub-systems are positioned in a void space around the blast tube.

Referring back to FIG. 1, the insulated blast tube uses a layer of phenolic resin to provide both the erosion and high temperature protection for the blast tube itself and the additional thermal insulation required to protect non-propulsion sub-systems such as CAS or TVC positioned in the void space around the blast tube inside rocket motor casing.

Phenolic resin is selected for its resistance to erosion or corrosion in the presence of very hot combustion gases (e.g., its low char rates). If the insulating material is quickly degraded and removed it is of no value. However, phenolic resin is not a very good insulating material. Its thermal conductivity is approximately 1 to 1.5 W/mK (Watts per Meter-Kelvin) whereas air is approximately 0.026 W/mK. The thermal conductivity of the resin is at least 38× that of air.

As a result, to provide the additional thermal insulation required to protect the non-propulsive sub-systems the insulating layer of phenolic resin must be much thicker e.g., 4×-5×, what it would otherwise be to just protect the blast tube. This additional thickness has two drawbacks. First, it adds weight to the blast tube and overall rocket motor. The additional weight can affect the position of the Cg in flight and may require additional weight forward on the rocket motor as counterbalance. Second, the increased thickness necessarily increases the diameter D2 of the blast tube, which in turn reduces the volume of void space available to accommodate non-propulsive sub-systems.

The present disclosure provides an insulated blast tube in which an insulating layer of a burn resistant material such as phenolic resin is formed on an interior surface of the blast tube to provide the necessary erosion and thermal insulation properties to protect the blast tube and a vacuum insulated layer is formed in the walls of the blast tube itself to provide the additional thermal insulation properties to protect any non-propulsive sub-systems positioned in the void space around the blast tube. The vacuum insulated layer being a far better thermal insulator than any burn resistant material or air.

For equivalent rocket motor designs and thermal insulation requirements, the vacuum insulated blast tube is lighter weight and has a smaller diameter D2. Less weight is generally desirable and specifically in a blast tube to ensure that the center of gravity (Cg) of the rocket in flight is properly positioned relative to the center of pressure (Cp). A smaller diameter produces a larger volume of void space to accommodate non-propulsive sub-systems. For like designs, the vacuum insulated blast tube will be at least 10% lighter and have a diameter D2 that is at least 20% smaller.

Figure 2:
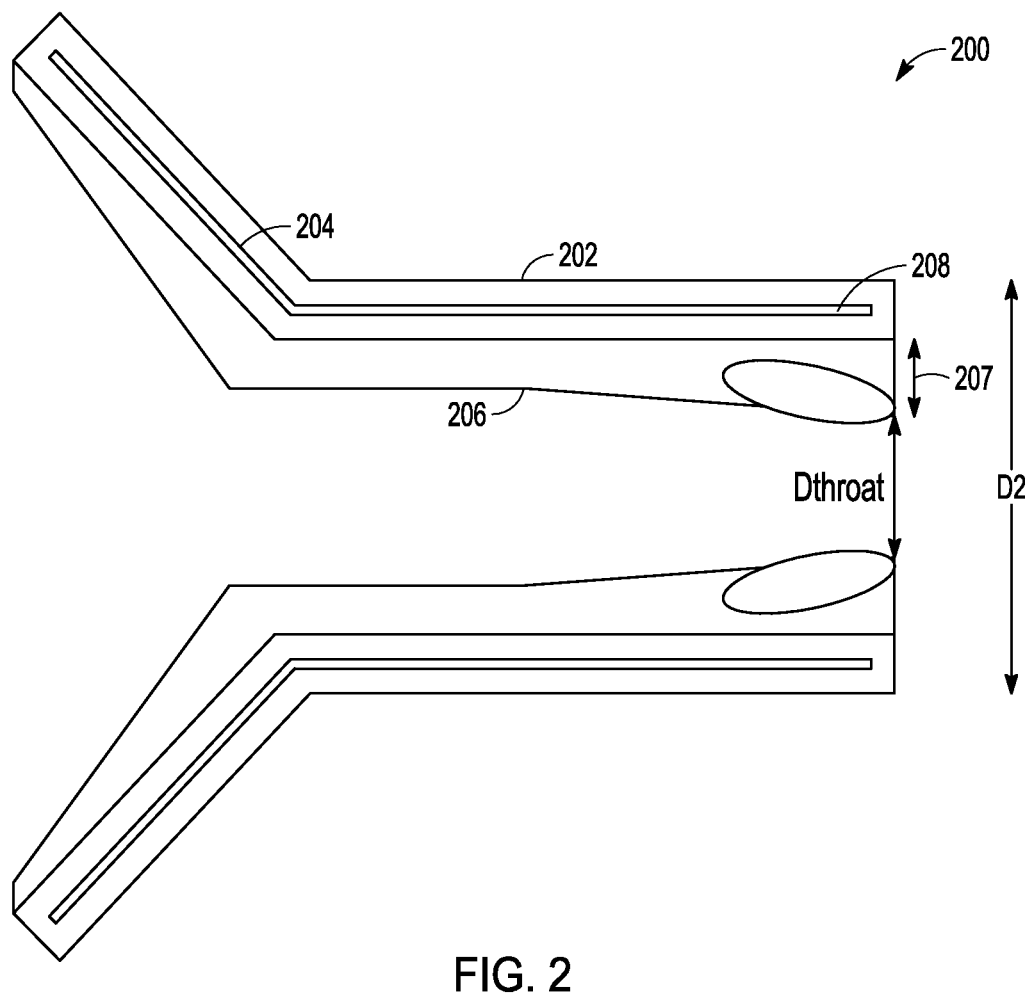
FIG. 2 is an embodiment of a vacuum insulated blast tube in which a layer of burn resistant material such as phenolic resin is formed on an inner surface of the blast tube of sufficient thickness to protect the blast tube and a vacuum insulating layer is formed within the blast tube to provide thermal insulation to protect any non-propulsive sub-systems positioned in a void space around the blast tube.

As shown in FIG. 2, an embodiment of a vacuum insulated blast tube 200 includes a hollow blast tube shell 202 defining a void space 204 therein along a length of the shell. An insulating layer 206 formed of a burn resistant material (e.g., phenolic resin) is formed on an interior surface of the shell 202. The thickness 207 of insulating layer 206 is selected to provide the required erosion protection and thermal insulation to protect the blast tube shell 202. The void space is sealed and held under vacuum with a pressure of less than 25 Torr (assuming operation of the rocket at or near sea level and room temperature of 25 C) and a thermal conductivity Tcond_vac of less than one-third of the thermal conductivity of air Tcond_air to form a vacuum insulation layer 208 to provide the additional thermal insulation required to protect non-propulsive sub-systems positioned in the void space around the blast tube. Typically, the thickness 207 is only sufficient to protect the blast tube shell 202, plus some safety margin, and does not appreciably contribute to the additional thermal insulation required for the sub-systems. To compare, thickness 207 of insulating layer 206 may be less than ½ or even ⅓ the total thickness of the insulating layer 120 shown in FIG. 1 in which the phenolic resin provided the insulation for both the blast tube and the sub-systems.

In different embodiments, the vacuum may be a medium vacuum between 25 Torr and $10^{-3}$ Torr or a high vacuum between $10^{-3}$ Torr and $10^{-6}$ Torr. A higher vacuum (lower pressure) corresponds to less particles (contaminants) in the vacuum and thus a lower thermal conductivity. Tcond_vac may be less than one-fifth the Tcond_air and reach a limit of approximately 6.6× less than air. Tcond_vac is about one two-hundred and fiftieth (½₅₀) that of phenolic resin and thus a much better thermal insulator. As a result, the thickness of the vacuum insulation layer can be significantly less than that of the additional phenolic resin that would otherwise be required to provide the additional thermal insulation.

In an embodiment, the burn resistant material is just thick enough to withstand erosion and elevated temperatures of hot gasses passing therethrough due to the combustion of propellant to protect the blast tube. The vacuum insulation layer provides additional thermal insulation to achieve a total thermal insulation to protect the non-propulsion sub-systems. For example, in all blast tube designs the burn resistant material will provide at most 40% of the total thermal insulation and the vacuum insulation layer provides at least 60% of the total thermal insulation. In many blast tube designs the burn resistant material will provide at most 25% and the vacuum insulation layer at least 75% of the total thermal insulation.

Figure 3A:
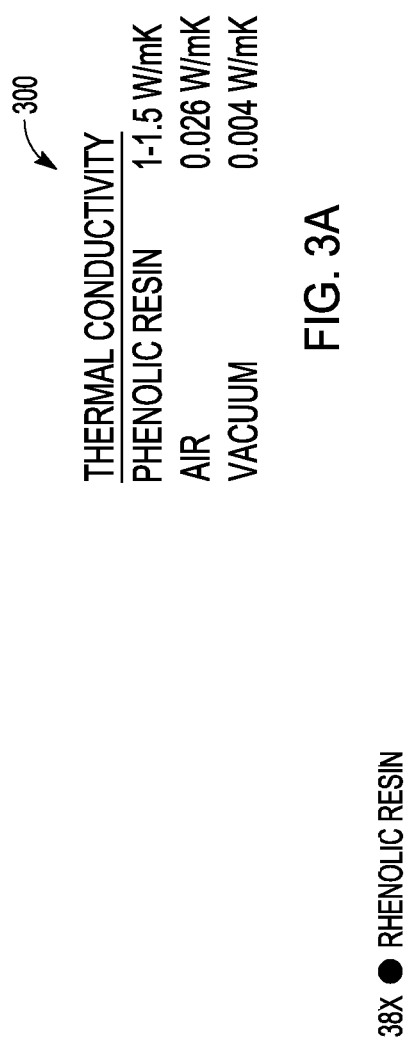
FIGS. 3A and 3B are a Table and a plot comparing the thermal conductivity of a vacuum to air and phenolic resin.
Figure 3B:
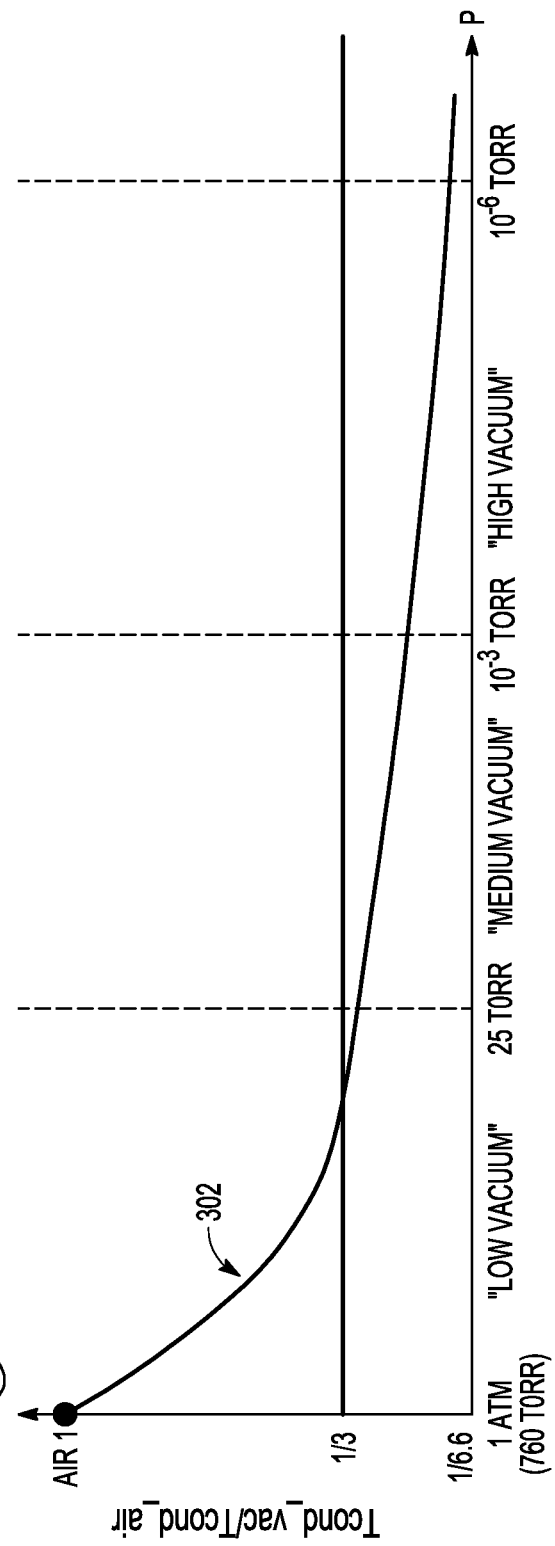

Referring now to Table 300 of FIG. 3A and a plot 302 of the relative thermal conductivity of a vacuum to air in FIG. 3B, at sea level and a temperature of 25 C, air has a thermal conductivity of approximately 0.026 W/mK, phenolic resin between 1 and 1.5 W/mK and a high vacuum of approximately 0.004 W/mK. As defined herein, a low vacuum is between 760 Torr (1 atm) and 25 (Torr), medium vacuum between 25 Torr and $10^{-3}$ Torr or a high vacuum between $10^{-3}$ Torr and $10^{-6}$ Torr. Under low vacuum the difference in thermal conductivity with air is insufficient to provide the requisite thermal insulating benefits given the requirement to form and hold a vacuum. At medium and high vacuum, the thermal conductivity of the vacuum is less than ⅓, preferably less than ⅕ and ideally approximately 1/6.6 that of air. This provides a substantial thermal insulating benefit over air, and a very substantial thermal insulting improvement over phenolic resin.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A vacuum insulated blast tube, comprising:
    a hollow blast tube shell defining a void space therein along a length of the hollow blast tube shell; and
    an insulating layer formed of a burn resistant material on an interior surface of the hollow blast tube shell,
    wherein the void space is held under vacuum with a pressure of less than 25 Torr and a thermal conductivity (Tcond_vac) of less than one-third of a thermal conductivity of air (Tcond_air) to form a vacuum insulation layer, and
    wherein an upstream end of the vacuum insulated blast tube connects to a downstream end of a combustion chamber of a rocket motor to receive hot gases from the combustion chamber and discharge the hot gases into a nozzle of the rocket motor.

2. The vacuum insulated blast tube of claim 1, wherein the pressure in the void space is a medium vacuum between 25 Torr and $10^{-3}$ Torr.

3. The vacuum insulated blast tube of claim 1, wherein the pressure in the void space is a high vacuum between $10^{-3}$ Torr and $10^{-6}$ Torr.

4. The vacuum insulated blast tuber of claim 1, wherein Tcond_vac is less than one-fifth Tcond_air.

5. The vacuum insulated blast tube of claim 1, wherein Tcond_vac is approximately 1/6.6 that of Tcond_air.

6. The vacuum insulated blast tube of claim 1, wherein Tcond_vac is less than one one-hundredth a thermal conductivity of the burn resistant material.

7. The vacuum insulated blast tube of claim 1, wherein the burn resistant material erodes as the hot gases pass through the vacuum insulated blast tube and protects the vacuum insulated blast tube from elevated temperatures of the hot gases passing therethrough due to combustion of propellant, wherein the vacuum insulation layer provides additional thermal insulation to achieve a total thermal insulation.

8. The vacuum insulated blast tube of claim 1, wherein the burn resistant material comprises a phenolic resin.

9. A vacuum insulated blast tube, comprising:
    a hollow blast tube shell defining a void space therein along a length of the hollow blast tube shell; and
    an insulating layer of phenolic resin having a thermal conductivity (Tcond_phenolic) on an interior surface of the hollow blast tube shell,
    wherein the void space is held under vacuum with a pressure of less than 103 Torr and a thermal conductivity (Tcond_vac) of less than one-fifth of a thermal conductivity of air (Tcond_air) to form a vacuum insulation layer, wherein Tcond_vac is less than one-two hundredth of Tcond_phenolic, and
    wherein an upstream end of the vacuum insulated blast tube connects to a downstream end of a combustion chamber of a rocket motor to receive hot gases from the combustion chamber and discharge the hot gases into a nozzle of the rocket motor.

10. The vacuum insulated blast tube of claim 9, wherein the insulating layer erodes as the hot gases pass through the vacuum insulated blast tube and protects the vacuum insulated blast tube from elevated temperatures of the hot gases passing therethrough due to the combustion of propellant, wherein the vacuum insulation layer provides additional thermal insulation to achieve a total thermal insulation.

11. A rocket motor, comprising:
    a cylindrical rocket motor casing having a diameter D1;
    a combustion chamber including a propellant positioned in the cylindrical rocket motor casing;
    a nozzle positioned aft of the combustion chamber to expel hot gases resulting from combustion of the propellant;
    a vacuum-insulated blast tube that couples the combustion chamber to the nozzle, said vacuum-insulated blast tube having a diameter D2<D1 that defines a first void space between the vacuum-insulated blast tube and the cylindrical rocket motor casing;
    one or more sub-systems positioned in the first void space, wherein the vacuum-insulated blast tube comprises:
        a hollow blast tube shell defining a second void space therein along a length of the hollow blast tube shell; and
        an insulating layer formed of a burn resistant material on an interior surface of the hollow blast tube shell that erodes as hot gases pass through the vacuum-insulated blast tube and protects the vacuum-insulated blast tube from elevated temperatures,
        wherein the second void space is held under vacuum with a pressure of less than 25 Tom and a thermal conductivity (Tcond_vac) of less than one-third of a thermal conductivity of air (Tcond_air) to form a vacuum insulation layer to provide additional thermal insulation to thermally insulate the one or more sub-systems, and
        wherein an upstream end of the vacuum-insulated blast tube connects to a downstream end of the combustion chamber to receive the hot gases from the combustion chamber and discharge the hot gases into the nozzle.

12. The rocket motor of claim 11, wherein the pressure in the second void space is a medium vacuum between 25 Torr and $10^{-3}$ Torr.

13. The rocket motor of claim 11, wherein the pressure in the second void space is a high vacuum between $10^{-3}$ Torr and $10^{-6}$ Torr.

14. The rocket motor of claim 11, wherein Tcond_vac is less than one-fifth Tcond_air.

15. The rocket motor of claim 11, wherein the burn resistant material comprises a phenolic resin.

16. The rocket motor of claim 11, wherein the burn resistant material erodes as the hot gases pass through the vacuum-insulated blast tube and protects the vacuum-insulated blast tube from elevated temperatures of the hot gases passing therethrough, wherein the additional thermal insulation achieves a total thermal insulation to protect the one or more sub-systems.

17. The rocket motor of claim 11, wherein the burn resistant material comprises a phenolic resin.

* * * * *